Oct. 17, 1972  R. S. SANDERSON  3,698,957
FUEL CELL SYSTEM HAVING A NATURAL CIRCULATION BOILER
Filed Dec. 16, 1970  2 Sheets-Sheet 1

INVENTOR
ROBERT A. SANDERSON
Laurence A. Savage
ATTORNEY

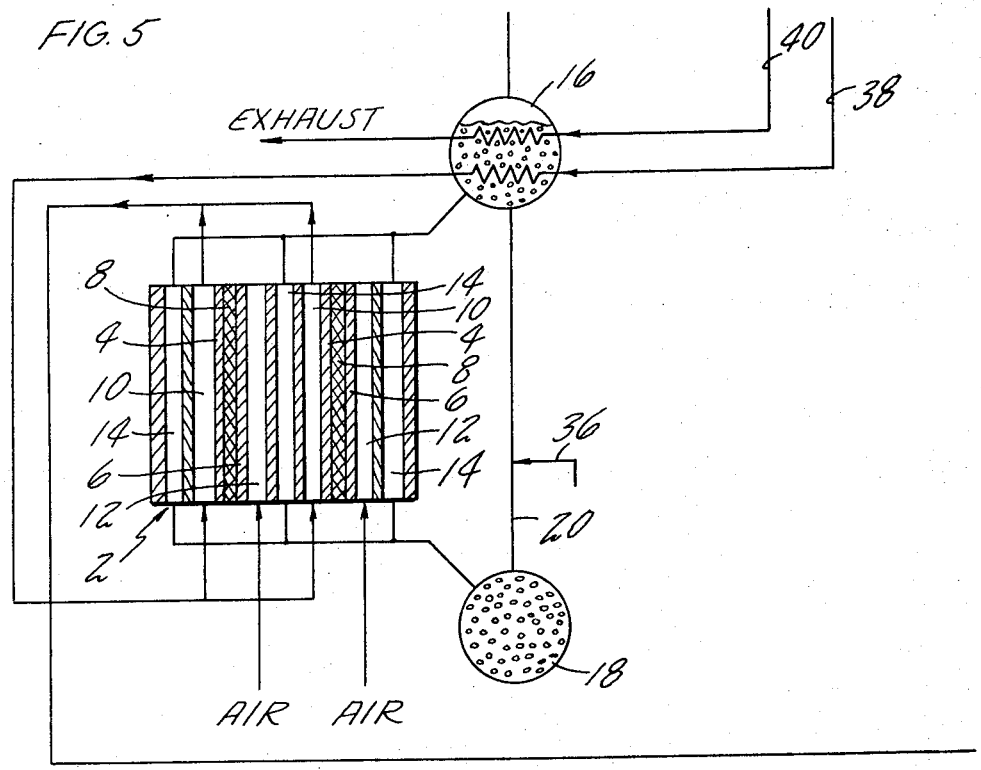

United States Patent Office 3,698,957
Patented Oct. 17, 1972

3,698,957
FUEL CELL SYSTEM HAVING A NATURAL CIRCULATION BOILER
Robert A. Sanderson, Wethersfield, Conn., assignor to United Aircraft Corporation, East Hartford, Conn.
Filed Dec. 16, 1970, Ser. No. 98,792
Int. Cl. H01m 27/14
U.S. Cl. 136—86 C          7 Claims

ABSTRACT OF THE DISCLOSURE

A natural circulation boiler for a fuel cell system is provided which both cools the fuel cell and provides steam for a steam reformer; the boiler is in contiguous heat exchange relationship with the fuel cell.

BACKGROUND OF THE INVENTION

Field of the invention

This invention relates to fuel cells and particularly to means for recovering heat from a fuel cell system for use in generating steam for the steam reforming process.

Description of the prior art

In a fuel cell system which generates electrical power from a hydrocarbon fuel and air, the fuel can be conditioned for use in the fuel cells using a steam reform process. In conventional systems steam for the reform process is provided by a boiler which is heated by burning additional fuel. The fuel cells are generally cooled by air or some other medium and the fuel cell stack waste heat is rejected to the environment. The requirement of additional fuel for the boiler and the rejection of fuel cell stack waste heat to the environment both result in a loss in steam reformer efficiency and a loss in overall power plant efficiency. The present invention increases the steam reformer efficiency from about 75 percent to about 90 percent, and also increases the overall power plant efficiency from about 32 percent to about 38 percent.

SUMMARY OF THE INVENTION

One object of the present invention is to provide means for generating steam and for cooling the fuel cell stack which maintains uniform thermal conditions within the system and the fuel cell stack, so that a large portion of the water enclosed in the boiler is available to flash during rapid increases in steam demand on the boiler by the reformer steam feed control and so that heat transfer rates within the system are improved.

Another object of the present invention is to eliminate the usual means for cooling a fuel cell stack which requires parasite power, i.e., power taken from the fuel cell electrical output.

Another object of the present invention is to increase the overall fuel cell system efficiency.

In accordance with the present invention the above and other objects are attained by a system in which a natural circulation boiler cools the fuel cell stack and provides steam for use in a steam reformer. More particularly, the natural circulation boiler comprises an upper drum in a fluid connection with a lower drum; fluid connection means are a riser and a downcomer. Liquid water circulated in the system flows down through the downcomer where it is mixed with feed water and flows to the lower drum. From the lower drum, water circulates through the riser, which is disposed within or adjacent, in heat exchange relationship with the fuell cell stack. The fuel cell waste heat boils the water in the riser; in the upper drum the steam generated in the fuel cell stack riser is separated and flows to the reformer or is vented, depending on the reformer steam requirement. A high water circulation flow rate in the system is induced by the density difference between the steam-liquid mixture in the riser and the liquid water in the downcomer.

In further accord with the present invention additional heat can be supplied during low power modes of operation of the fuel cell by heat exchange means in the lower drum or the upper drum utilizing heat in the hydrogen stream from the reformer and the burner exhaust gas from the reformer.

Of course, a multiplicity of fuel cell stacks with their attendant risers can be connected to a common upper drum and lower drum with the advantage that cell stack temperature is regulated at the correct temperature independent of the heat generation from the individual stacks.

The foregoing and other objects, features and advantages of the present invention will become more apparent in light of the following detailed description of the preferred embodiment thereof, as illustrated in the accompanying drawings.

BRIEF DESCRIPTION OF THE DRAWINGS

FIG. 5 is a partial schematic illustration of another embodiment of a fuel cell system utilizing the present invention.

DESCRIPTION OF THE PREFERRED EMBODIMENT

Figure 1:
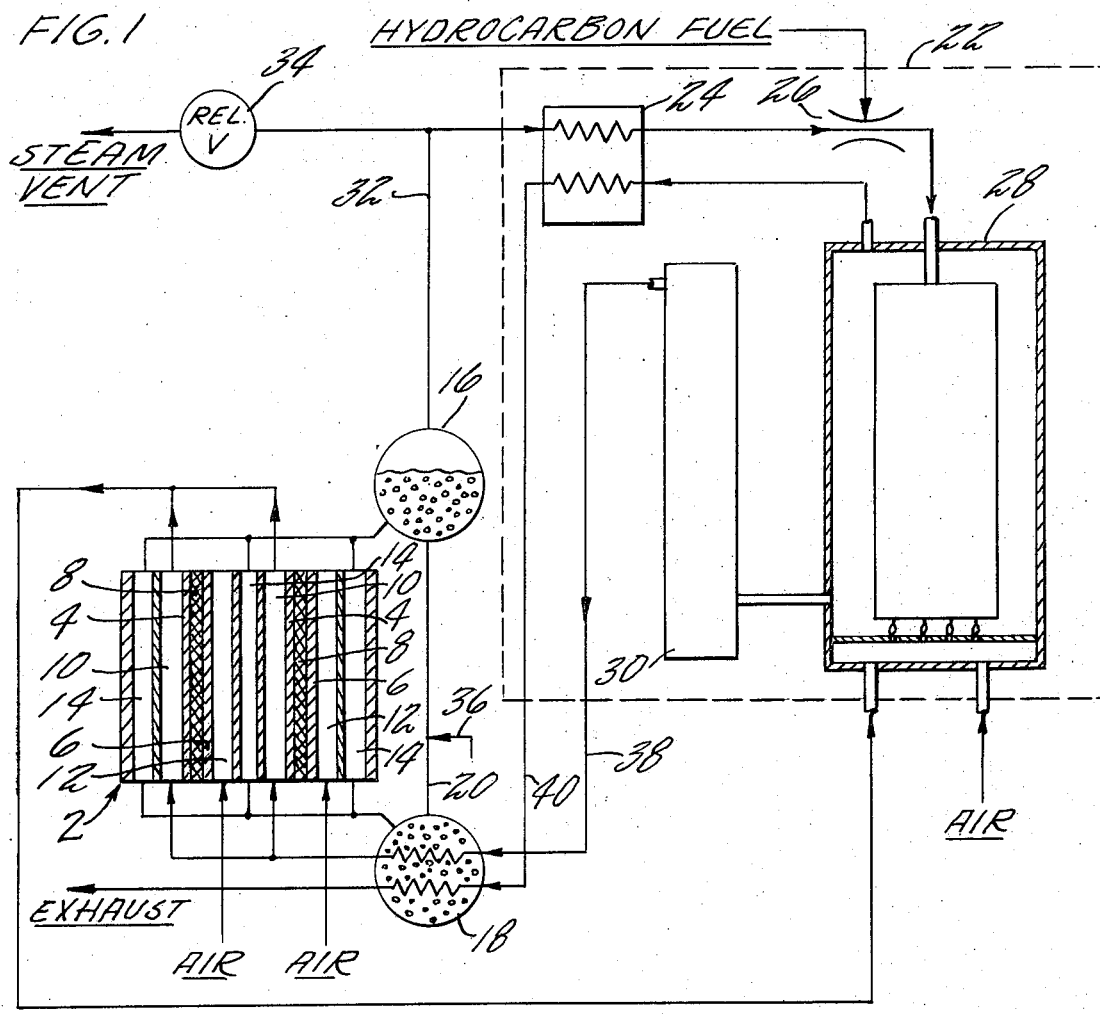
FIG. 1 is a schematic illustration of a fuel cell system utilizing the present invention.

Referring to FIG. 1 there is shown a hydrocarbon-air fuel cell system which may advantageously employ my invention. A fuel cell, shown generally by the numeral 2, comprises anodes 4, cathodes 6, matrices 8, fuel chambers 10 and air chambers 12. Cooling passages 14 are shown and may comprise a portion of the risers for the natural circulation boiler. The boiler comprises an upper drum 16, a lower drum 18, a downcomer 20 and a riser, which is shown schematically as the cooling passages 14 of the fuel cell. Thus, the natural circulation boiler can be seen to both cool the cell stack and provide steam for the steam reformer, shown generally by the dotted-line box 22. The steam reformer consists of a super-heater 24, means 26 which may be, for example, an ejector for mixing the hydrocarbon fuel and steam, a reactor 28 and a shift converter 30. Neither the fuel cell 2 itself, nor the steam reformer 22 itself, comprise any part of my invention, both being well known in the art.

In operation steam generated in the upper drum 16 is separated and flows through line 32 to the reformer 22 or to the steam vent valve 34, depending on the reformer steam requirement. If the pressure builds up to a point above a predetermined limit, the steam vent valve 34 will open and allow the excess steam to vent to a low pressure sink, which may be, for example the atmosphere. Liquid water circulated in the system flows down through the downcomer 20 where it is mixed with feedwater introduced by line 36, and flows to the lower drum 18 from whence it is circulated to the riser. Obviously, as shown, a multiplicity of cell stacks can be connected with their risers to a common upper and lower drum.

In an operating system of this type, there is more steam generated in the fuel cell stack risers at high power levels than is required by the steam reformer. The excess steam is vented to maintain proper boiler pressure, which in turn, maintains correct fuel cell temperature. At low power levels the fuel cell stacks can produce insufficient steam for use in the reformer, and supplementary heat to the system can be provided by heat exchange means in the lower drum as shown using the heat in the hydrogen stream to the cells in line 38 and the heat in the burner exhaust stream from the reformer in line 40. It will be obvious that line 38 and 40 could just as usefully be routed through the upper drum 16 (as shown in FIG. 5) instead of through the lower drum 18, with the same result of supplying additional heat to the steam production system.

Figure 2:
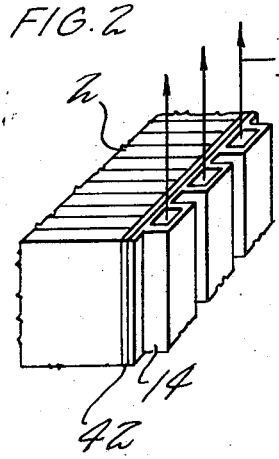
FIG. 2 is a partial perspective view of one method of constructing the riser in heat exchange relationship with the fuel cell stack in accordance with the present invention.

Referring now to FIG. 2, there is shown on means of placing the riser in heat exchange relationship with fuel cells to both cool the fuel cell stack 2 and boil the water within the riser 14. A dielectric material 42 may be placed between the riser 14 and the cell stack 2 to prevent electrical conduction therebetween.

Figure 3:
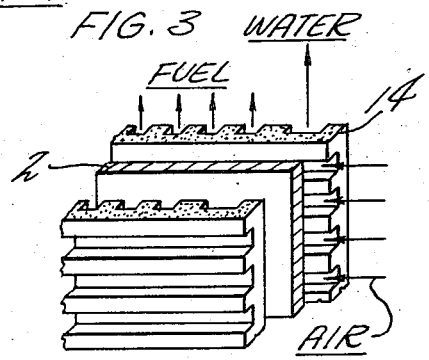
FIG. 3 is a partial perspective view of another method of constructing the riser in heat exchange relationship with the fuel cell stack in accordance with the present invention.

FIG. 3 shows another means of placing the riser 14 in heat exchange relationship with the fuel cell stack 2 to both cool the cell stack and boil the water within the riser.

Figure 4:
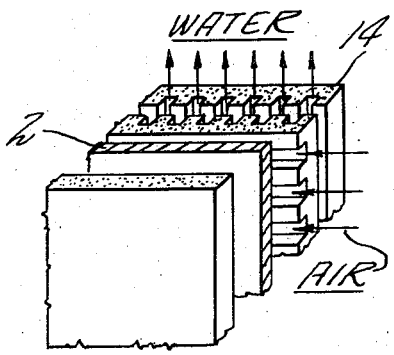
FIG. 4 is a partial perspective view of still another embodiment showing means for constructing the riser in heat exchange relationship with the fuel cell stack.

In FIG. 4 still another means of placing the riser 14 in heat exchange relationship with the fuel cell stack 2 is shown.

There has thus been described a preferred embodiment of a natural circulation boiler in accordance with the present invention. It should be understood by those skilled in the art that while specific embodiments have been utilized herein to teach my invention, that is, the use of a natural circulation boiler which both cools the fuel cell stacks and provides steam for the steam reforming process, various changes and omissions in the form and detail thereof may be made therein without departing from the spirit and scope of the invention.

What I claim as novel and desire to secure by Letters Patent of the United States is:

1. In combination with a fuel cell utilizing a hydrocarbon fuel and having a steam reformer for supplying hydrogen to the fuel cell and having a burner, a natural circulation boiler for cooling the fuel cell and providing steam for the reformer, said boiler comprising an upper drum, a lower drum, a downcomer in fluid connection with said upper and lower drums, and riser means disposed in continuous heat exchange relationship with said fuel cell and providing a fluid connection between said lower drum and said upper drum, said upper drum also being in fluid connection with said steam reformer.

2. A natural circulation boiler as defined in claim 1, wherein said riser means is disposed within said fuel cell.

3. A natural circulation boiler as defined in claim 1, wherein said riser means is disposed adjacent said fuel cell.

4. A natural circulation boiler as defined in claim 1, wherein additional heat may be supplied to said boiler during low power modes of operation of said fuel cell by heat exchange means in said lower drum utilizing the heat in the hydrogen gas stream proceeding from said reformer to said fuel cell.

5. A natural circulation boiler as defined in claim 1, wherein additional heat may be supplied to said boiler during low power modes of operation of said fuel cell by heat exchange means in said upper drum utilizing the heat in the hydrogen gas stream proceeding from said reformer to said fuel cell.

6. A natural circulation boiler as defined in claim 1, wherein additional heat may be supplied to said boiler during low power modes of operation of said fuel cell by heat exchange means in said lower drum utilizing the heat of the said reformer burner exhaust gas.

7. A natural circulation boiler as defined in claim 1, wherein additional heat may be supplied to said boiler during low power modes of operation of said fuel cell by heat exchange means in said upper drum utilizing the heat of said reformer burner exhaust gas.

References Cited
UNITED STATES PATENTS

| | | | |
|---|---|---|---|
| 3,455,743 | 7/1969 | Huebscher et al. | 136—86 C |
| 3,488,226 | 1/1970 | Baker et al. | 136—86 C |
| 3,498,844 | 3/1970 | Sanderson | 136—86 B |
| 3,539,395 | 11/1970 | Bartas | 136—86 C |
| 3,607,419 | 9/1971 | Keating, Jr. | 136—86 B |

ALLEN B. CURTIS, Primary Examiner